(12) United States Patent
Rustad et al.

(10) Patent No.: US 7,774,089 B2
(45) Date of Patent: Aug. 10, 2010

(54) METHOD AND APPARATUS FOR DISABLING PORTS IN A MOTOR CONTROL SYSTEM

(75) Inventors: James S. Rustad, Jackson, WI (US); Scott D. Braun, Fredonia, WI (US); Neil W. Knutsen, Milwaukee, WI (US); Gregory W. Mears, Sussex, WI (US); John H. Stuedemann, Milwaukee, WI (US); James B. Vitrano, South Milwaukee, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 513 days.

(21) Appl. No.: 11/206,883

(22) Filed: Aug. 18, 2005

(65) Prior Publication Data

US 2007/0043467 A1    Feb. 22, 2007

(51) Int. Cl.
    *G06F 19/00* (2006.01)
(52) U.S. Cl. .............. 700/170; 700/1; 700/28; 709/220; 709/224
(58) Field of Classification Search .......... 709/220, 709/224; 700/28, 1, 170
    See application file for complete search history.

(56) References Cited

U.S. PATENT DOCUMENTS

| | | | | |
|---|---|---|---|---|
| 4,254,473 A | * | 3/1981 | Galdun et al. | 710/2 |
| 5,862,338 A | * | 1/1999 | Walker et al. | 709/224 |
| 6,233,242 B1 | * | 5/2001 | Mayer et al. | 370/412 |
| 6,609,163 B1 | * | 8/2003 | Nguyen et al. | 710/21 |
| 6,656,012 B1 | * | 12/2003 | DeAngelis et al. | 446/454 |
| 6,984,950 B2 | | 1/2006 | Jonsson et al. | |
| 7,092,771 B2 | | 8/2006 | Retlich et al. | |
| 2002/0095573 A1 | * | 7/2002 | O'Brien | 713/168 |
| 2004/0098148 A1 | | 5/2004 | Retlich et al. | |
| 2004/0177194 A1 | * | 9/2004 | Benson et al. | 710/300 |
| 2004/0210348 A1 | | 10/2004 | Imhof et al. | |
| 2006/0129336 A1 | | 6/2006 | Pretlove et al. | |
| 2007/0043853 A1 | * | 2/2007 | Rustad et al. | 709/224 |

FOREIGN PATENT DOCUMENTS

JP    2004064866 A    *    2/2004

\* cited by examiner

*Primary Examiner*—Albert DeCady
*Assistant Examiner*—Tejal J Gami
(74) *Attorney, Agent, or Firm*—Quarles & Brady LLP; Alexander R. Kuszewski; John M. Miller (57) ABSTRACT

A motor control host includes a plurality of ports, a memory, and a processing device. The memory is operable to store an enable mask defining an enablement state for each of the ports. The processing device is operable to send a first message over those selected ports having an affirmative enablement state to maintain a communication link over the selected ports and inhibit the first message for those ports having a negative enablement state. A method for configuring a motor control system including a motor control host having a plurality of ports includes storing an enable mask defining an enablement state for each of the ports. A first message is sent over those selected ports having an affirmative enablement state to maintain a communication link over the selected ports. The first message is inhibited for those ports having a negative enablement state.

3 Claims, 5 Drawing Sheets

METHOD AND APPARATUS FOR DISABLING PORTS IN A MOTOR CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motor control systems and, more particularly, to a method and apparatus for disabling ports in a motor control system.

Rotating motors are typically controlled by a motor drive that receives reference signals and motor feedback signals and outputs a torque signal that is applied to the motor. The torque signal is adjusted base don the feedback signals to ensure that the motor rotates at the desired velocity.

Modern motor control systems include networked environments, where information may be provided to the motor drive from multiple sources coupled to the network. For example, control messages (e.g., "START", "STOP", "JOG", etc.) may be received from various sources, such as a local pushbutton or control panel, a networked workstation, an industrial controller, etc. Furthermore, other messages may be received for configuring the motor drive, thereby altering its settings relating to the configuration of the controlled motor or the internal algorithms it uses for adjusting the torque signal, for example.

Commonly, a motor drive includes a plurality of ports for communicating messages with other network entities. Local ports may be provided for connecting a human interface module (HIM) including a display screen and a keypad or other input device. Other ports may be coupled to the network through various interface circuitry to communicate with remote devices. Still other ports may be flexible, accepting either a local or remote interface.

The peripheral devices coupled to the ports serve various purposes, including monitoring, communication, configuration, control, and data collection. These functions may be changed as the system is reconfigured and peripheral devices are added or replaced with different peripherals. In certain motor control systems, a high level of security may be desired to control the access available to the peripheral devices for affecting the configuration or control of the motor control system. Previously, this security may have been provided through a locked cabinet or other physical barrier. For network ports, security may be provided through the general password functions of the computer system. As the number and flexibility of ports used to communicate with a motor drive increases, it becomes more difficult to maintain the effectiveness of physical barriers or general network security measures in preventing unauthorized access.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

The present inventors have recognized that an enable mask may be used to control the enablement status of individual ports on a motor control host. The motor control host may then maintain or let lapse communication links through the ports based on the enablement mask.

One aspect of the present invention is seen in a motor control host including a plurality of ports, a memory, and a processing device. The memory is operable to store an enable mask defining an enablement state for each of the ports. The processing device is operable to send a first message over those selected ports having an affirmative enablement state to maintain a communication link over the selected ports and inhibit the first message for those ports having a negative enablement state.

Another aspect of the present invention is seen in a method for configuring a motor control system including a motor control host having a plurality of ports. The method includes storing an enable mask defining an enablement state for each of the ports. A first message is sent over those selected ports having an affirmative enablement state to maintain a communication link over the selected ports. The first message is inhibited for those ports having a negative enablement state.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
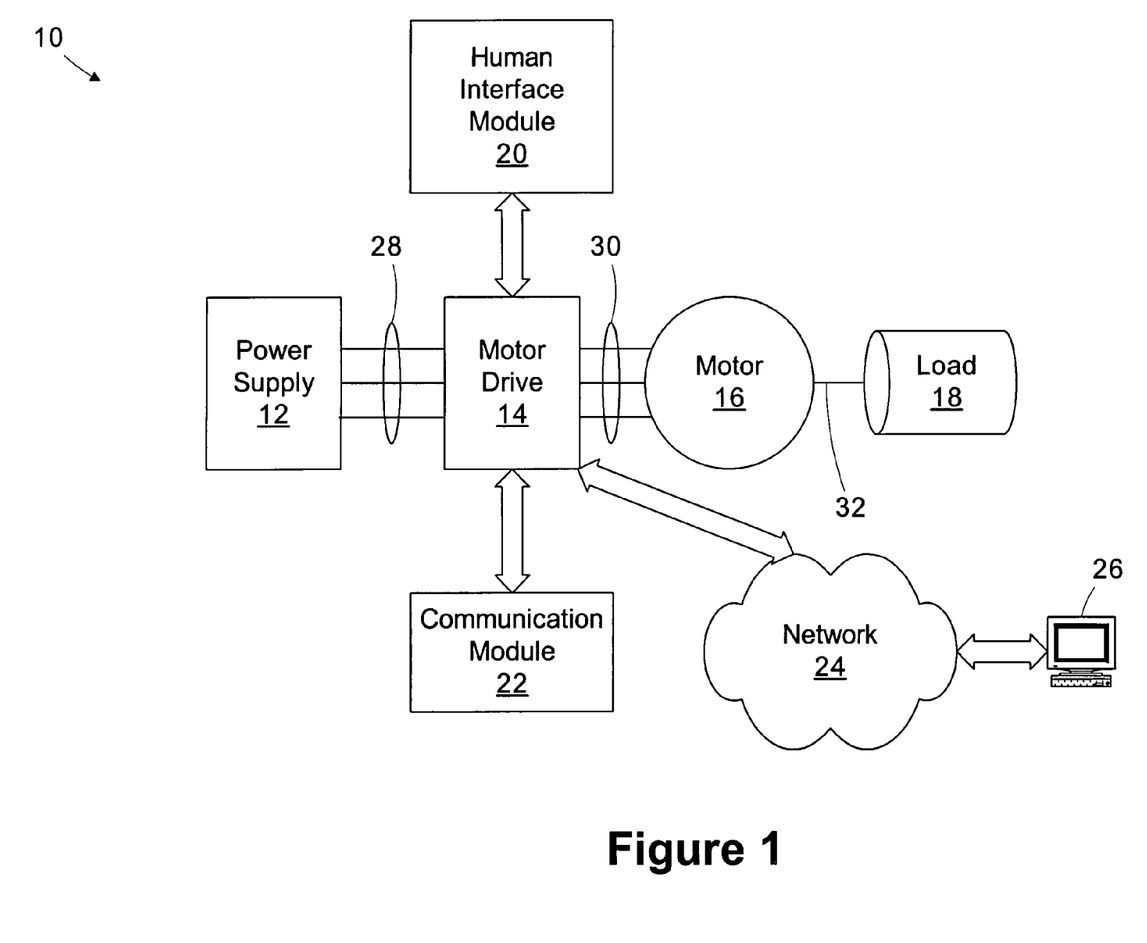
FIG. 1 is a simplified block diagram of a motor control system in accordance with one embodiment of the present invention.

Referring now to the drawings wherein like reference numbers correspond to similar components throughout the several views and, specifically, referring to FIG. 1, the present invention shall be described in the context of a motor control system 10. The motor control system 10 includes a power supply 12, a motor drive 14, a three-phase motor 16, a load 18, and a plurality of lines and buses that link the aforementioned components together in the manner described hereinafter. The motor drive 14 is shown interfacing with a human interface module (HIM) 20, a communication module 22, and a network 24, including one or more workstations 26. As will be described in greater detail below, the motor control system 10 employs a security protocol that limits the sources of configuration messages that seek to configure the motor drive 14 and/or associated peripherals (e.g., the communication module 22, the HIM 20, the workstation 26, etc.)

The power supply 12 typically provides a three phase AC voltage received from a utility grid over lines 28. The nominal line voltage of the power supply 12 may vary depending on the particular implementation. The motor drive 14 receives 3-phase power from the power supply 12 and converts the AC power to DC. The motor drive employs a plurality of switching devices (e.g., BJT's, etc.) such that by opening and closing specific combinations of the switches, positive and negative DC voltage pulses are generated on each of the supply lines 30 to the motor 16. By opening and closing the inverter switches in specific sequences, AC voltages having controllable amplitudes and frequencies can be generated on each of the supply lines 30. Each of the lines 30 is linked to a separate one of three-phase windings of the motor 16. By providing known sequences of AC voltages across the motor windings, varying currents are caused therein which induce a rotating magnetic field within a motor stator core. A motor rotor (not illustrated) which is linked to a motor shaft 32 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. The load 18 is attached via shaft 32 to the rotor and therefore, when the rotor rotates, load 18 also tends to rotate in the same direction.

The motor drive 14 may be controlled and or configured via interfacing devices using local connections, such as through the human interface module 20, or through remote connections established over the network 24 or through the communication module 22. A number of different communication networks are commonly used in the motor control art including, but not limited to, ControlNet, DeviceNet and EtherNet/IP whose specifications are published and whose protocols are used broadly by a number of manufacturers and suppliers. These communication networks differ from one another in physical aspects, for example, the type of media (e.g., co-axial cable, twisted pair, light fiber, etc.); the protocols of its operation, (e.g., Baud rate, number of channels, word transmission size, use of connected messaging, etc.) and how the data is formatted and how it is collected into standard messages.

Figure 2:
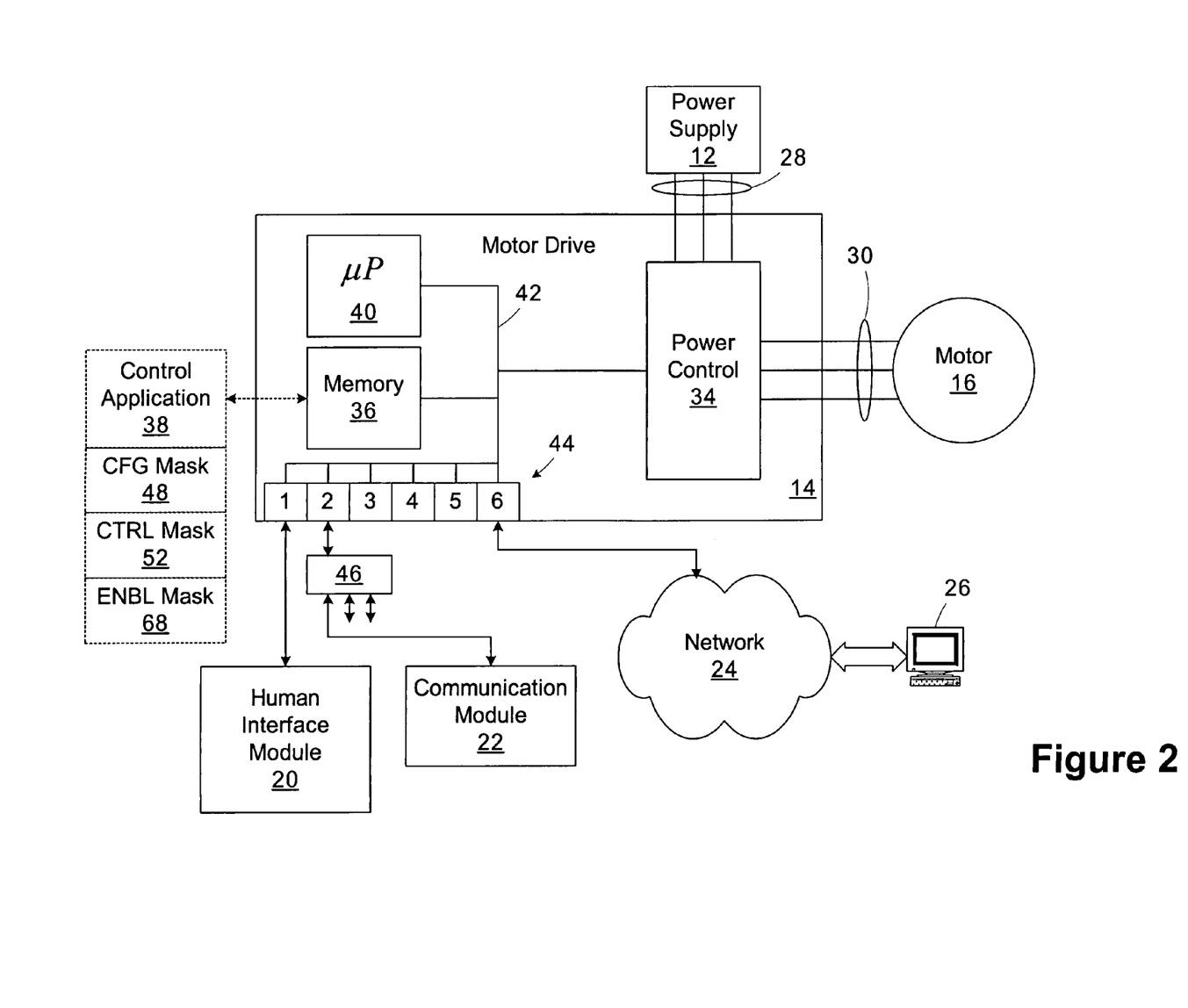
FIG. 2 is a block diagram of the motor drive.

Turning now to FIG. 2, a simplified diagram of the motor drive 14 is provided. The motor drive 14 includes power control electronics 34 for generating voltage controlled power to the motor 16, a memory 36 for storing program instructions embodied in a control application 38, a microprocessor 40 for executing the control application 38, a local bus 42 for communication between the microprocessor 40, memory 36, and a plurality of interface ports 44 (i.e., numbered 1-6). The ports 44 may have various topologies, depending on the particular implementation. For example, the ports 44 may be general serial ports, network interfaces, HIM interfaces, etc. The ports 44 may be expandable.

In the illustrated embodiment, Port 1 is configured as a HIM port allowing the interface between the motor drive 14 and the HIM 20. Port 2 is an expandable external port, whereby a splitter 46 may be attached to Port 2 to expand its capabilities to function as three discrete ports, thereby logically addressing ports 2, 3, and 4 on the motor drive 14. Port 2 is coupled to the communication module 22. Port 5 is designated as a universal port, to which various adapters (not shown) may be attached to allow it to be used as a HIM port, a serial port, a network interface, etc. Port 6 is configured as a network interface, allowing a connection to the network 24.

The motor drive 14 implements a security protocol that controls the flow of configuration messages over the motor control system 10. Although the following discussion described the configuration security protocol as it may be implemented by the motor drive 14 acting as a motor control host, the invention is not so limited, and other entities, such as motor protection devices, may also serve as motor control hosts. Devices associated with the motor control host are referred to as peripherals, which may include the HIM 20, the communication module 22, the workstation 26, or other entities on the network 24.

Configuration messages are distinguished from control messages in that control messages include commands for operating the motor, such as start, stop, clear fault, set direction, set acceleration, set deceleration, set reference, etc., while configuration messages relate to the configuration of the motor drive 14, not its operation. Exemplary configuration parameters include motor type (e.g., permanent magnet or induction), type of feedback device (e.g., A quad B encoder, resolver, million line encoder), feedback counts per revolution, feedback device number of taps, motor overload service factor, two or three wire control, current limit, regenerative power limit, controller gain constants, preset speeds, motor nameplate data, velocity bandwidth, position bandwidth, inertia constants, etc.

Figure 3:
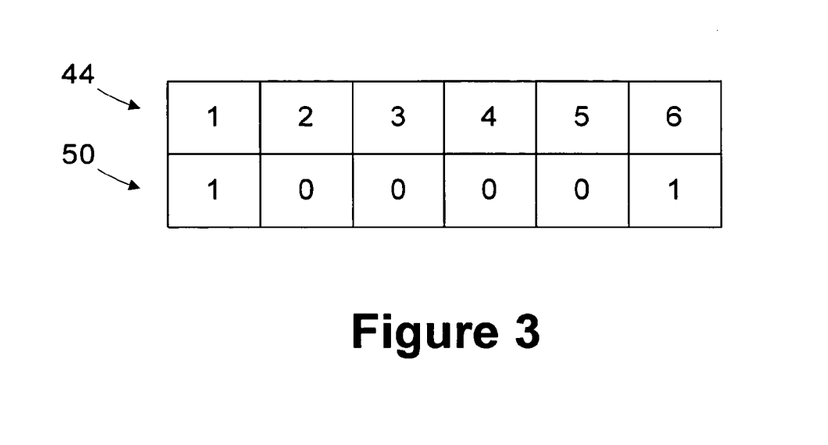
FIG. 3 is a diagram illustrating a configuration mask employed by the motor drive of FIG. 2.

The motor drive 14 stores a configuration mask 48 that defines the ports through which configuration messages may be received. Turning briefly to FIG. 3, a diagram of the configuration mask 48 is provided. The configuration mask 48 includes a plurality of bits 50, each associated with one of the ports 44. If the particular bit 50 for a port 44 is enabled, the port 44 is allowed to be a source of configuration messages for the motor drive 14 or other peripherals. In the exemplary configuration mask 48 of FIG. 3, ports 1 and 6 are enabled for configuration write access. Hence, configuration messages may only be received from the HIM 20 or a device on the network 24, such as the workstation 26.

Returning to FIG. 2, the motor drive 14 may also implement a control access protocol using a control mask 52 specifying the sources of control messages. A technique for implementing control message access control is described in U.S. Pat. No. 5,455,762, entitled "MOTOR CONTROLLER HAVING MULTIPLE COMMAND SOURCES," subject to assignment to the assignee of the present invention, and incorporated herein by reference in its entirety.

Still referring to FIG. 2, the motor drive 14 rejects configuration messages addressing the motor drive 14 if the message originates from a port 44 that has been masked in the configuration mask 48. For example, given the configuration mask shown in FIG. 3, the motor drive 14 will accept a configuration message from the HIM 20, but reject a configuration message coming from the communication module 22 over port 2.

In some embodiments, the peripheral devices may also be configured to implement the configuration security protocol and may be thus referred to as being "security aware". A security aware peripheral will not attempt to send a configuration message to the motor drive 14 or other peripheral if configuration messages are not enabled for its associated port 44. For example, if a configuration message were sent through the communication module 22, an error would be returned to its source immediately, and the motor drive 14 would never receive the configuration message. If the communication module 22 was not security aware, the motor drive 14 would reject the configuration message and send an error message back to the communication module 22. The communication module 22 would subsequently send another error message to the source of the configuration message indicating the error.

Figure 4:
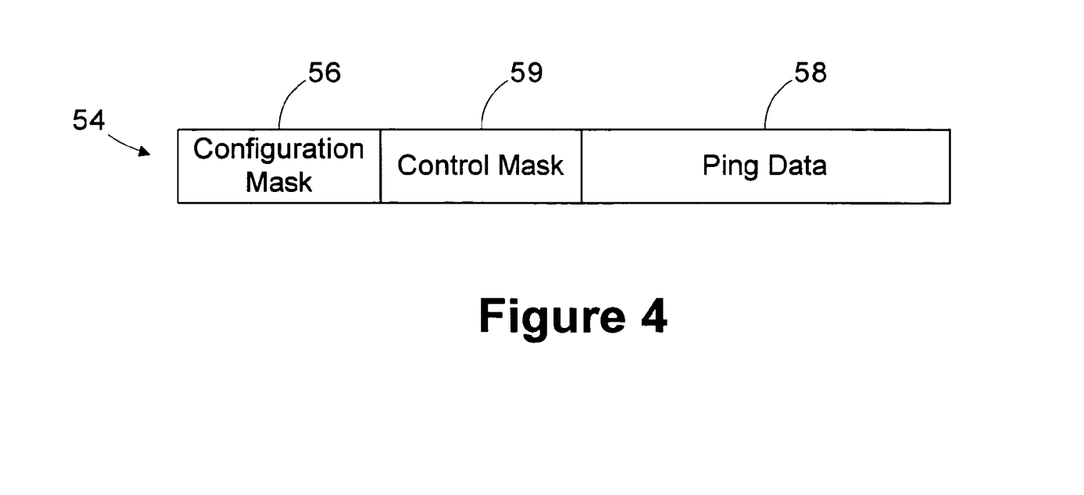
FIG. 4 is a diagram illustrating a ping message sent to the peripheral devices in the motor control system of FIGS. 1 and 2.

The motor drive 14 communicates the configuration status of the motor control system 10 by periodically sending a "ping" message to each of its ports 44. Referring briefly to FIG. 4, the format of a ping message 54 is illustrated. The ping message 54 includes a field 56 containing the configuration mask 48 appended to the typical ping data 58. The ping message 54 may include a validation key or other type of error detection and/or correction to ensure its accuracy. Ping messages are typically used in the motor control system 10 as a "heartbeat" signal for verifying the presence of a communication link between the motor drive 14 and its peripherals. If a peripheral device fails to receive a ping message within a predetermined time interval, it enters an error state indicating a loss of communication and does not attempt further communication with the motor drive 14 until the error state is cleared.

Those peripherals that are security aware access the field 56 in the ping message 54 containing the configuration mask 48 and configure their respective firmware or software applications to prevent the sending of messages through ports 44 that do not have security access or to reject configuration messages originating from blocked ports 44.

In one embodiment, the motor drive 14 blocks control messages based on the states defined in the control mask 52. In another embodiment, the peripherals may be security aware for both configuration and control purposes, and block both configuration and control messages for which they are not authorized to send. In such an embodiment, an additional field 59 may be provided in the ping message 54 to communicate the control mask 52 to the peripherals, as shown in FIG. 4.

Hence, the configuration mask 48 and the control mask 52 may be generally referred to as security masks, and the peripherals may be security aware and locally block messages that fail to meet the constraints defined by the security mask(s) without sending them to the motor drive 14 or other peripherals.

The operation of the present invention is now described using several implementation examples. In a first example shown in FIG. 5, the motor drive 14 is mounted in a locked cabinet 60 with a door-mounted HIM 62 connected to port 2. The security constraints for the implementation provide that the door-mounted HIM 62 provide only monitoring capabilities. The motor drive 14 is controlled only through its terminal block (not shown). Changing the configuration of the motor drive 14 requires that the cabinet be unlocked and an additional HIM 64 be coupled to port 1 (i.e., the internal HIM port). After the motor drive 14 is initially configured, the value of the configuration mask 48 is set such that only the bit 50 associated with port 1 is set (e.g., 000001), thereby disallowing configuration access from all ports 44 other than the internal HIM port. The control mask 52 is set to allow control access only through the terminal block.

Figure 5:
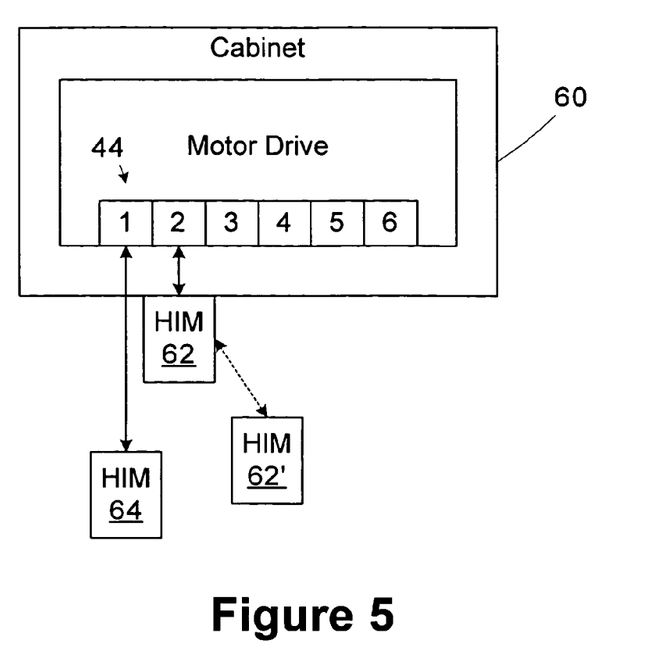
FIGS. 5 and 6 are simplified block diagrams of the motor drive of FIG. 1 interfacing with differing peripheral devices.

When the motor drive 14 comes out of reset, it sends ping messages 54 through its ports 44 including the configuration mask 48. The door-mounted HIM 62 will be allowed to log in, but will be unable to perform any control or configuration functions. The door-mounted HIM 62 will detect from the ping message 54 that it is not authorized to perform any configuration functions, i.e., those including a "Set Attribute" message. If the user replaces the door-mounted HIM 62 with a HIM 62' that is not security aware, the HIM 62' will allow the user to attempt operations requiring set attribute messages, however, the motor drive 14 will block those messages from the door-mounted HIM 62'. The HIM 62' displays an error message each time the motor drive 14 blocks one of the configuration messages it sends. The HIM 62' will receive similar messages from the motor drive 14 if it attempts to send control messages (i.e., except "STOP", which is typically always honored for safety reasons). If the user desires to change the security associated with the motor drive 14, the HIM 64 could be installed in port 1 and used to change the value of the configuration mask 48.

Figure 6:
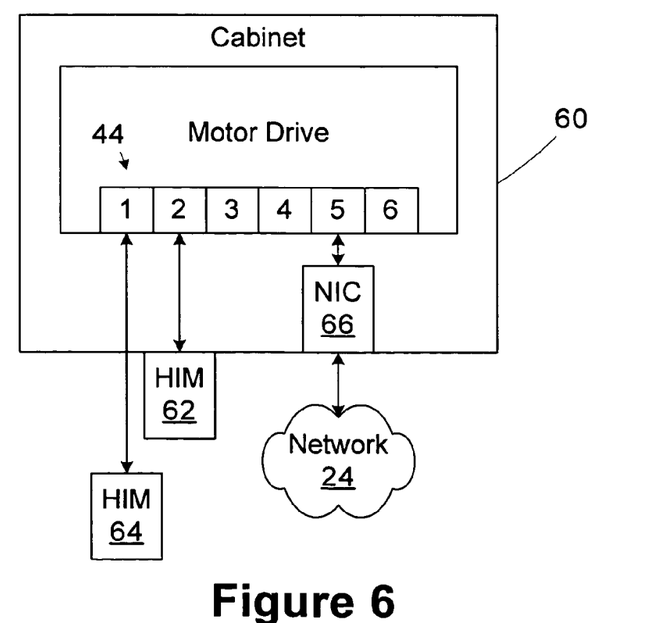

In another example shown in FIG. 6, the motor drive 14 is mounted is mounted in a locked cabinet 60 with a door-mounted HIM 62 connected to port 2 and an internal network interface 66 (e.g., EtherNet/IP) on port 5 (e.g., communicating with the network 24). The security constraints for the implementation provide that the door-mounted HIM 62 provide only monitoring capabilities. The network interface 66 is allowed to control and configure the motor drive 14. A HIM 64 on port 1 may also be used to configure the motor drive 14, as described in the first example. After the motor drive 14 is initially configured, the value of the configuration mask 48 is set that only the bits 50 associated with ports 1 and 5 are set (e.g., 010001), thereby disallowing configuration access from all ports 44 other than the internal HIM port or the network interface. The control mask 52 is set to allow only control access through the network interface 66.

When the motor drive 14 comes out of reset, it sends ping messages 54 through its ports 44 including the configuration mask 48. The door-mounted HIM will be allowed to log in, but will be unable to perform any control or configuration functions. The door-mounted HIM 62 will detect from the ping message 54 that it is not authorized to perform any configuration functions, i.e., those including a "Set Attribute" message. The network interface 66 will log in and identify that it is authorized for both control and configuration.

If the user desires to change the security associated with the motor drive 14, the user sends a message over the network interface 66 or uses a HIM 64 installed in port 1 to change the value of the configuration mask 48. Neither the door-mounted HIM 62 nor the HIM 64 installed in port 1 will be allowed to control the motor drive 14 (i.e., except for STOP).

In some embodiments, the motor drive 14 may be configured to completely disable one or more of its ports 44 for all communication purposes. For example, a user may want to interrupt data collection from a specific port. The heartbeat function implemented using the ping messages 54 is employed to disable selected ports 44. As shown in FIG. 2, an enable mask 68, having a format similar to the configuration mask 48 shown in FIG. 4, is employed to designate those ports 44 that are enabled (e.g., a bit is set for each enabled port). The enable mask 68 may be set by a device having configuration access to the motor drive 14, as delineated in the configuration mask 48. Based on the value of the enable mask 68, the motor drive 14 modifies its pinging routine to ping only those ports having an enable bit set. Hence, if a port 44 is not enabled in the enable mask 68, it will never receive an initial ping message 54 following a reset, and therefore, never recognize the motor drive 14. Alternatively, if the value of the enable mask 68 is changed while the motor drive 14 is already online, the disabled port(s) 44 will stop receiving ping messages 54, time out, and enter a failed communication state. In the failed communication state, the device will not attempt to send any message or data to the motor drive 14 through its port 44.

Figure 7:
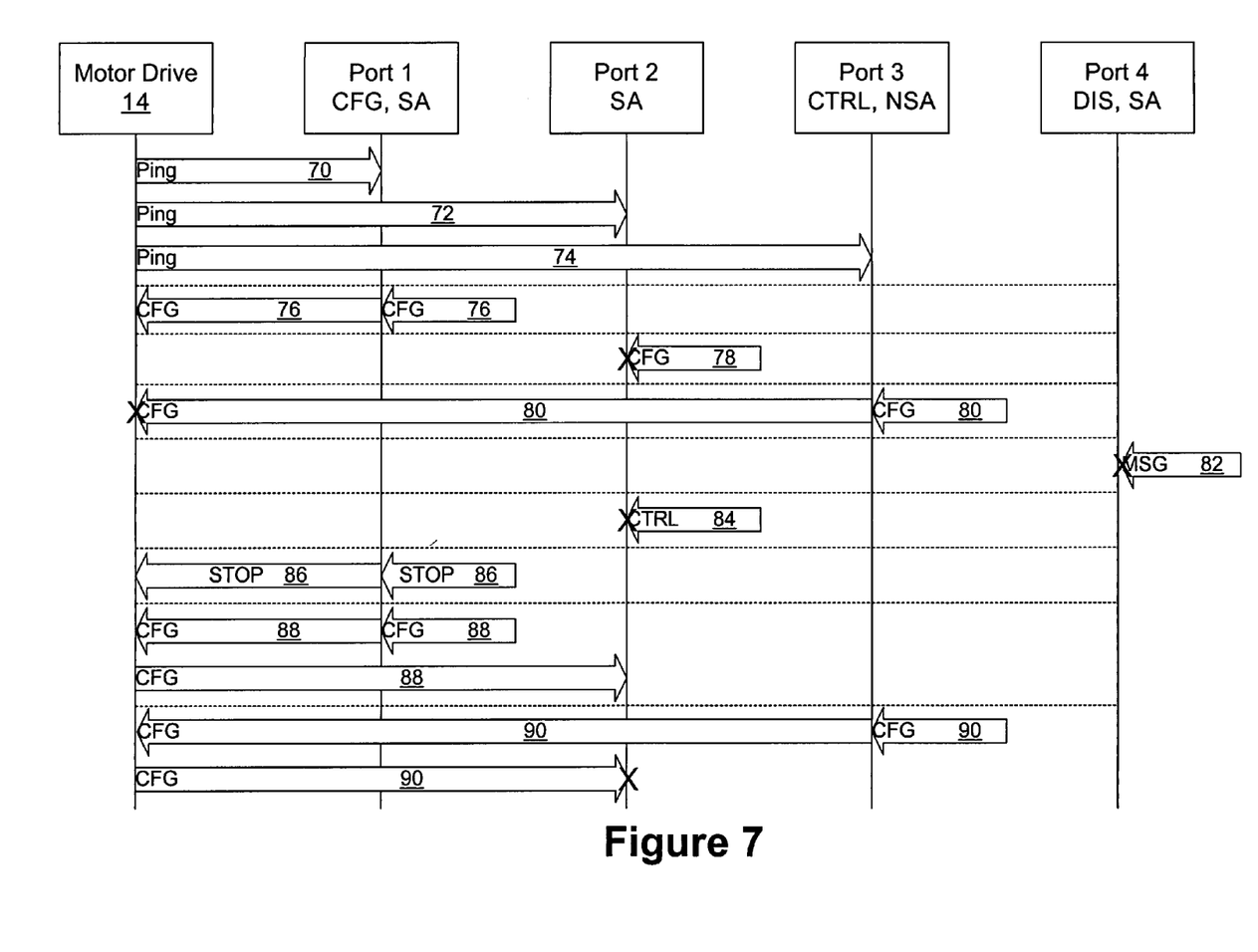
FIG. 7 is a diagram illustrating message traffic between the motor drive of FIG. 2 and devices coupled to its multiple ports.

The operation of the motor drive 14 is further described in reference to the simplified message flow diagram provided in FIG. 7. For the example shown in FIG. 7, port 1 is enabled for configuration access as defined by the configuration mask 48, port 2 is enabled for observation only, port 3 is enabled for control messages as defined by the control mask 52, and port 4 is disabled as defined by the enable mask 68. The devices associated with ports 1, 2, and 4 are security aware, and the device associated with port 3 is not security aware.

When the motor drive 14 comes out of reset, it sends ping messages 70, 72, 74 to each of the ports 1, 2, and 3, enabled by the enable mask 68. The ping messages 70, 72, 74 include the configuration mask 48. The devices associated with ports 1 and 2 interpret the configuration mask 48 and recognize their permissions. The motor drive 14 periodically resends the ping messages 70, 72, 74 to maintain communication over ports 1, 2, and 3, but these recurring messages are not illustrated, A configuration message 76 originating from the device associated with port 1 is allowed under the configuration mask 48 and forwarded to the motor drive 14.

A configuration message 78 arriving at port 2 is blocked immediately, as the device associated with port 2 is security aware and recognizes that port 2 is not enabled in the configuration mask 48.

A configuration message 80 arriving at port 3 is forwarded to the motor drive 14, as the device at port 3 is not security aware. However, the motor drive 14 blocks the configuration message 80, because port 3 is not enabled in the configuration mask 48.

A message 82 (i.e., any message or data) arriving at port 4 is blocked because the device at port 4 has no established connection with the motor drive 14 as it never received a ping message.

A control message 84 originating from port 2 may be blocked by the device if it is security aware for both configuration and control purposes and received the control mask 52 in the ping message 72. Alternatively, but not illustrated in FIG. 7, the control message 84 may be blocked by the motor drive 14.

A stop message 86 received at port 1 is forwarded to the motor drive 14 even though the device at port 1 is not authorized for control messages, because stop messages are always honored in the illustrated embodiment.

A configuration message 88 originating from port 1 for configuring the device at port 2 is sent to the motor drive 14 and forwarded to port 2.

A configuration message 90 originating from port 3, which is not security aware, for configuring the device at port 2 is sent to the motor drive 14 and forwarded to port 2. However, port 2 blocks the configuration message 90 as port 3 is not recognized as a valid source for configuration messages in the configuration mask 48.

The security protocol provided by the present invention has numerous advantages. Peripherals may be limited in their rights for changing the configuration of entities in the motor control system 10. Security masks may also be communicated by a motor control host to security aware peripherals to inform each peripheral of its respective access rights. Such aware peripherals will not attempt to communicate messages for which they are not authorized. The security protocol also allows the complete disabling of a port by forcing the port into a loss of communication state. These features allow enhanced security control over the sources of various messages in a motor control system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A motor control system, comprising:
 a motor control host connected to a motor;
 a plurality of communication ports for communicating messages with at least one of network entities, Human Interface Modules (HIMs), and serial ports;
 a memory having stored therein an enable mask defining an enablement state for each of the plurality of communication ports as at least one of an affirmative enablement state and negative enablement state, and a security mask defining a configuration mask designating ports through which configuration messages may be received, the configuration messages including at least one of a motor type, type of feedback device, feedback counts per revolution, feedback device number of taps, motor overload service factor, two or three wire control information, current limit, regenerative power limit, controller gain constant, preset speed, velocity bandwidth, position bandwidth, and inertia constant, and a control mask designating control access for each of the communication ports, the control access including at least one of sending a start, stop, clear fault, set direction, set acceleration, set deceleration, and set reference instruction; and a processing device configured to access the enable mask stored in the memory and send a first message over selected ports having the affirmative enablement state to maintain a communication link over the selected ports and inhibit the first message from being communicated over ports having the negative enablement state, the first message including the configuration mask and the control mask, the processing device being configured to access the security mask and send and receive control communications only over ports designated in the control mask and send and receive configuration communications only over ports designated in the configuration mask.

2. The motor control system of claim 1, wherein the motor control host includes a motor drive unit.

3. The motor control system of claim 1, wherein the motor control host includes a motor protection device coupled to a motor drive unit.

* * * * *